United States Patent [19]

Oliver et al.

[11] Patent Number: 5,710,709
[45] Date of Patent: Jan. 20, 1998

[54] NC MILLING SIMULATION AND DIMENSIONAL VERIFICATION VIA DEXEL REPRESENTATION

[75] Inventors: James H. Oliver; Yunching Huang, both of Ames, Iowa

[73] Assignee: Iowa State University Research Foundation, Inc., Ames, Iowa

[21] Appl. No.: 109,781

[22] Filed: Aug. 19, 1993

[51] Int. Cl.$^6$ .................. G05B 19/4097; G06T 17/00
[52] U.S. Cl. .................. 364/474.26; 364/474.24; 395/120; 395/964
[58] Field of Search .................. 364/474.26, 474.24, 364/474.22, 474.2, 188, 189, 191, 192, 193, 468.03, 468.04; 395/120, 141, 152, 161, 121, 122, 124, 964, 965

[56] References Cited

U.S. PATENT DOCUMENTS

| | | | |
|---|---|---|---|
| 4,736,306 | 4/1988 | Christensen et al. | 364/474.24 X |
| 4,791,579 | 12/1988 | Kranitzky | 364/474.24 X |
| 5,038,291 | 8/1991 | Wang et al. | 364/474.24 X |
| 5,119,309 | 6/1992 | Cavendish et al. | 364/474.24 |
| 5,272,642 | 12/1993 | Suzuki | 364/474.24 |

OTHER PUBLICATIONS

Robert Light, et al., "Modification of geometric models through variational geometry," *Computer Aided Design*, vol. 14, No. 4, pp. 209–214, Jul., 1982.

Pigel, L. et al. "Curves and Surface Construction Unsing Rational B-splines," *Computer Aided Design*, vol. 19, No. 9, pp. 485–497, Nov., 1987.

Shimada, T. et al., 1989, "Development of Curved Surfaces using Finite Element Method," *Proceedings of the first international conference on Computer–Aided Optimum Design of Structures*, Recent Advances, Springer–Verlag, New York pp. 23–30.

Shimada, T. et al., "Approximate Transformation of Arbitrary Curved Surface Into a Plane using Dynamic Programming Computer–Aided Design", vol. 23, No. 2, pp. 153–150. Mar., 1991.

Redont, P., "Representation and Deformation of Developable Surfaces," *Computer Aided Design*, vol. 21, No. 1, pp. 13–20, Feb., 1989.

Clements, J. C. et al. "A Fast, Accurate Algorithm for the Isometric Mapping of a Developable Surface," *Siam Journal on Mathematical Analysis*, vol. 18, No. 4, pp. 966–971, Jul., 1987.

(List continued on next page.)

*Primary Examiner*—Joseph Ruggiero
*Attorney, Agent, or Firm*—Schwegman, Lundberg, Woessner, & Kluth, P.A.

[57] ABSTRACT

A method and apparatus are presented for five-axis NC milling process simulation and dimensional verification. An algorithm is utilized which employs a dexel representation of the workpiece and milling tool to reduce the complexity of the solid representation and associated Boolean operations. This representation is exploited to obtain high computational efficiency which affords real-time visual verification of milling processes. Simulation is presented as animated images while a unique discrete dexel verification algorithm simultaneously performs calculations of milling error between the emerging workpiece and actual design surfaces. Milling errors are depicted by levels of color on the milled workpiece. The verification result precisely reveals the quality of the tool paths in a realistic depiction of the actual process, which is helpful for determining tool path modifications and additional finishing processes. Several graphical results of a software implementation are included to demonstrate the capabilities and robustness of this verification algorithm.

20 Claims, 10 Drawing Sheets

Microfiche Appendix Included
(1 Microfiche, 54 Pages)

OTHER PUBLICATIONS

Kincaid, et al., "Numerical Analysis Mathematics of Scientific Computing," University of Texas at Austin, Brooks/Cole Publishing, pp. 64–71, 1991.

Meyers, et al., "Surfaces from Contours," University of Alabama at Birming–ham, Association for Computing Machinery, pp. 229–258, 1992.

Kawashima, et al., "A flexible quantitative method for NC machining Verification using a space–division based solid model," *The Visual Computer*, vol. 7, 149–157, 1991.

Jerard, et al., "Approximate methods for simulation and verification of numerically controlled machining programs," *The Visual Computer*, vol. 5, pp. 329–348, 1989.

A. B. Ekoule, et al., "A Triangulation Algorithm from Arbitrary Shaped Multiple Planar Contours," *ACM Transactions on Graphics*, vol. 10, No. 2, pp. 182–199 Apr., 1991.

Ki–Yin Change, et al., "A Method for NC Toolpath Interference Detetection for a Multi–Axis Milling System," *Control of Manufacturing Processes*, DSC–vol. 52, pp. 23–30, 1991.

R. E. Barnhill, et al., "A marching method for parametric surface/surface intersection," *Computer Aided Geometric Design 7*, pp. 257–280, 1990.

Robert L. Drysdale III, et al., "Disrete Simulation of NC Machining," Algorithmica, pp. 33–60, 1989.

Takafumi Saito, et al., "NC Machining with G–buffer Method," *Computer Graphics*, vol. 25, No. 4, pp. 207–216, Jul. 1991.

Yunching Huang, "Non–Constant Parameter NC Tool Path Generation on Sculptured Surfaces," *Computers in Engineering*, vol. 1, pp. 411–419, 1992.

Tim Van Hook, "Real–Time Shaded NC Milling Display," *Siggraph '86*, vol. 20, No. 4, pp. 15–20, 1986.

Joseph Pagna, et al. "Designing and Mapping Trimming Curves on Surfaces Using Orthogonal Projection,"; Date Unknown.

Ashish P. Narvekar, Yunching Huang and James H. Oliver, "Intersection of RaysWith Parametric Envelope Surfaces Representing Five–Axis NC Milling Tool Swept Volumes" DE–vol. 44–2, *Advances in Design Automation*, vol. 2, ASME 1992, pp. 223–230.

J. P. Menon and D. M. Robinson, "High Performance NC Verification VIA Massively Parallel Raycasting: Extensions to New Phenomena and Geometric Domains" PED vol. 59, *Concurrent Engineering* ASME 1992, pp. 179–194.

Peter R. Atherton, "A Scan–line Hidden Surface Removal Procedure for Constructive Solid Geometry", *Computer Graphics*, vol. 17, No. 3, Jul. 1983, pp. 73–82.

Michael E. Mortenson, *Geometric Modeling*, Relational Properties, pp. 310–311; 1985.

James D. Foley et al., "Spatial–Partitioning Representations" *Second Edition, Computer Graphics*, Principles and Practice, pp. 549–550; 1990.

J.H. Oliver and E.D. Goodman, "Direct Dimensional NC Verification" pp. 2–9; Jan., Feb., 1990.

J.H. Oliver, "Efficient Intersection of Surface Normals with Milling Tool Swept Volumes for Discrete Three–Axis NC Verification", *Journal of Mechanical Design*, Jun. 1992, vol. 114, pp. 283–287.

Malhotra, et al., "Synthesis of Spatially and Intrinsically Constrained Curves Using Simulated Annealing," ASME Transactions, Journal of Mechanical Design, DE–vol. 32–1 Alliances in Design Automation—vol. 1 ASME 1991 pp. 145–155.

Huang, et al., "Five–Axis NC Milling Simulation and Dimensional Verification via Dexel Representation", Computer Aided Design, Special Issue on NC Machining and Cutter Path Generation, B.K. Choi, ed. May 31, 1993, pp. 1–16.

Nair, et al., "An Area Preserving Transformation Algorithm for Press Forming Blank Development", Department of Mechanical Engineering, Iowa Center for Emerging Manufacturing Technology, Iowa State University, Ames, Iowa 50011–2160; Date Unknown.

Oliver, et al., "Automated Generation of Sculptured Surface Models", Artificial Intelligence in Optical Design and Manufacturing, Z. Dong, ed., Prentice–Hall Environmental and Intelligent Manufacturing Systems Series, M. Jamshidi, Series, ed., 1993 (Aug.), Chapter 1, pp. 1–25.

Michael E. Mortenson, Geometric Modeling, Relational Properties, pp. 310–311; 1985.

NC MILLING SIMULATION AND DIMENSIONAL VERIFICATION VIA DEXEL REPRESENTATION

The present invention was made with the support of the U.S. Government under the Office of Naval Research grant numbers N00014-92-J-4092. The U.S. Government may have certain rights in the invention.

MICROFICHE APPENDIX

Included with the present specification is a microfiche appendix having 1 page and 54 frames containing a listing of a source code computer program written in the C language. The program is adapted to execute on a Silicon Graphics Workstation Model CMNB003, Indigo R300 with Elan graphics, under variation 4.05 of the Silicon Graphics IRIX operating system, as compiled using ANSI C compiler, version 3.10.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates generally to numerically controlled (NC) milling, and more particularly to apparatus and method for NC milling simulation and dimensional verification.

BACKGROUND OF THE INVENTION

Numerically controlled (NC) milling technology directs a cutter through a set of pre-recorded sequential trajectories to fabricate a desired shape from raw stock. This technology is capable of producing free-formed sculptured surfaces while maintaining tight milling error tolerances. Consequently, NC milling technology is widely used in the production of complicated, high precision, and low quantity products such as molds, dies, and aerospace parts, etc. These products, especially molds and dies, typically influence many other subsequent production processes, thus the importance of NC milling processes are profound. In order to improve the accuracy and reliability of NC milling, verification methods are used to check milling tool paths for potential problems including milling error, collision, improper machining parameters, etc. These problems will typically lead to unqualified products, machine damage, or personnel injuries. Consequently NC verification is a very important procedure for NC production.

Traditionally, NC verification is conducted by observing the line drawings of tool paths or performing test milling on soft or less expensive materials[1]. These methods suffer from difficulties such as inaccuracy, expense, or timeliness, and therefore are gradually being replaced by analytical methods using graphical displays. Analytical methods are implemented to graphically simulate the milling process off-line and, in some cases, verify milling error, tool assembly collision, and other machining parameters. Consequently, NC programmers can visualize the shape of milled parts and understand potential problems in an efficient, less expensive, and more accurate way.

Analytical methods of NC simulation and verification are distinct from techniques used to model milling phenomenon and formulate milling problems. These methods can be categorized into three approaches including direct solid modeling, discrete vector intersection, and spatial partitioning representation. Each of these approaches has been applied to five-axis NC verification but with varying ranges of applicability and degrees of success. The following discussion summarizes the past research spawned by each approach.

Direct Solid Modeling Approach

The essence of the direct solid modeling approach is to simulate material removal process through direct Boolean difference operations between a solid model of the workpiece and solid models of swept volumes of the milling tool[2,3]. The milling process can be realistically simulated and the result is an explicit solid model of the milled workpiece that can be graphically presented and reviewed. Since the milled part is explicitly defined by a solid representation, subsequent analysis and computation of milling error, volume removal rate, or milling dynamics can be readily performed. For instance, the milling error is computed as the difference between milled part (A) and designed part (B) by using Boolean difference operations, i.e., A-B represents the solid geometry of undercut material and B-A represents overshoot. Furthermore, the severity of a "miss" or "gouge" at a specified point (P) on A can be obtained by computing the minimum distance between P and B. Although the direct solid modeling approach is theoretically capable of presenting accurate results of NC verification, the applications remain limited. The limitation results from the complexity of Boolean difference operations between solid entities. The Boolean difference operation requires computation of the intersection between the shells of two solid entities[4]. In NC milling application the intersection involves the shell of a moving cutter modeled by a swept volume and the shell of the workpiece. Since the formulation of five-axis swept volume of a typical milling tool is quite complicated[5], performing accurate Boolean difference operations is difficult. Moreover, a tool path may contain hundreds or thousands of tool motions which makes the computational cost for characterizing the geometry of an entire milled part prohibitively expensive.

Discrete Vector Intersection Approach

The discrete vector intersection approach verifies milling error by computing distances between a set of pre-selected surface points and tool swept volumes[1,6,7]. Each surface point has an associated vector (typically the outward normal), called a point-vector pair. Hence the distance calculation is equivalent to finding the intersections between tool swept volumes and lines defined by the point-vector pairs[8]. The discrete vector intersection approach is best described in terms of three sub-tasks: discretization, localization, and intersection[1]. The discretization task transforms the designed surfaces into a sufficiently dense distribution of surface point-vector pairs. Localization provides a means of extracting a plausible subset of point vector pairs for each tool motion. Finally, intersection provides the computation of the distance between each surface point and the tool swept volumes. The discrete vector intersection approach can provide high accuracy in computing the milling error, if a proper discretization algorithm is incorporated. Milling error information is displayed by levels of color that depict the magnitudes of error on the designed part surfaces[1,6]. Hence, by observing the resulting figures, NC programmers can locate the problems of tool paths and perform path modification. Possible drawbacks of this approach are: realistic NC simulation is not supported and methods for computing material removal rate and machining dynamics are not obvious.

Spatial Partitioning Representation Approach

The primary disadvantage of the direct solid modeling method for NC verification, i.e., the complexity of the Boolean difference operation, has motivated the spatial partitioning representation approach. This method decomposes a solid object into a collection of simple-shaped basic elements or subregions to simplify the Boolean operations. An implementation of this approach was proposed by van Hook[9]. In his implementation, solid objects are scan-converted into a set of dexels (depth elements) which represent rectangular solids extending along the z-axis of the screen coordinate system. Each dexel is defined by an integer pair which addresses a cell of a two-dimensional data array and a pair of depth values that describe the near and far ends of the object. The two dimensional array is called a dexel data structure and is used to address pixels of a display screen. Boolean operations in the dexel data structure are performed by updating the depth values of a finite number of dexels, hence the computation is very efficient. This dexel-based approach is not as versatile or accurate as the direct solid modeling approach. However, due to the limitation of screen display resolution, gaps between dexels are not visually detectable. Consequently, very realistic shaded three-axis milling simulation is possible. Other implementations using similar types of basic elements for solid representation include ray-representation[10], G-buffer data structure[11], and Graftree data structure[12]. Using these techniques, realistic NC milling simulation can be efficiently performed and the results are very helpful for visual detection of gross milling errors. However, accurate dimensional milling verification as in the discrete vector intersection approach has not been addressed using the spatial partitioning approach.

SUMMARY OF THE INVENTION

The present invention extends the spatial partitioning method to five-axis NC simulation and describes a novel incorporation of dimensional milling error verification within the simulation algorithm to provide graphical verification of NC milling verification. A discrete dexel NC verification system is proposed which combines a spatial partitioning representation and discrete vector intersection approaches to exploit their respective advantages and compensate for their shortcomings. The verification system is unique in several other respects. First, five-axis tool paths are efficiently simulated by realistic animated images on a computer screen for visual examination of tool paths and finish parts. Second, color-coded information depicting ranges of milling error is displayed on the milled workpiece, not the design surfaces. Thus, the milled workpiece image can closely match an actual workpiece. Third, since the designed surfaces are not discretized, accurate milling error can be efficiently computed, and the difficulty of localization in the normal vector approximation approach is avoided.

According to another aspect of the invention, a method of part design comprises creating a part design using a computer aided design (CAD) system, creating NC milling tool paths to create the part, verifying the tool paths using the discrete dexel NC verification system, making any required adjustments to the tool paths based on the verification, and finally milling the desired tool by NC milling.

DETAILED DESCRIPTION OF THE INVENTION

Figure 1:
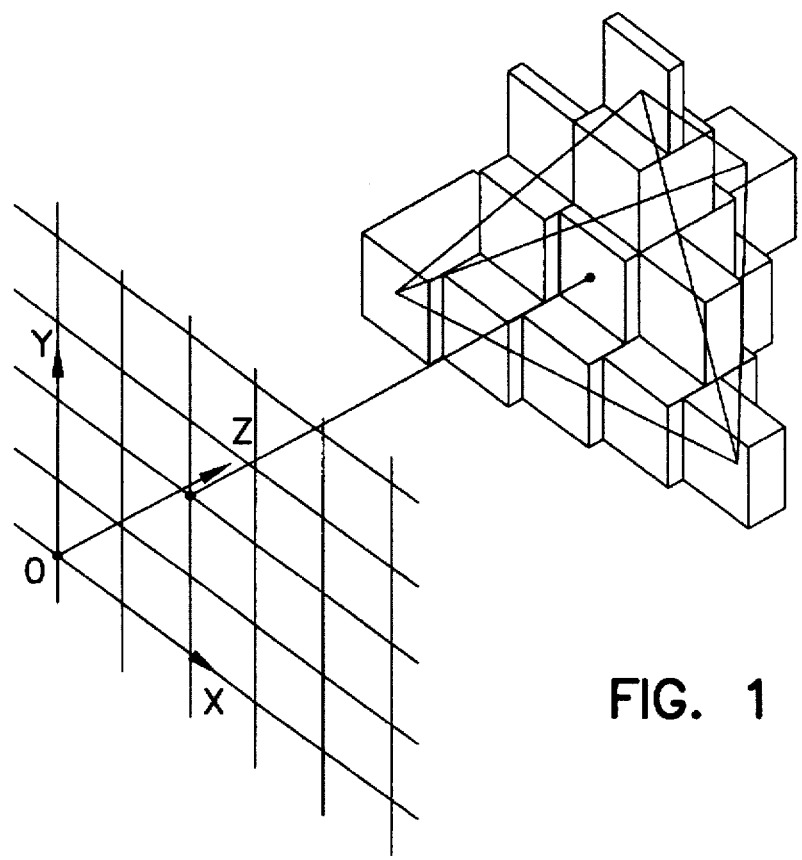
FIG. 1 is a perspective view of a dexel representation of a tetrahedron in the preferred embodiment of the present invention.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

DEXEL REPRESENTATION OF SOLID

According to the present invention, a dexel representation is developed to characterize the geometry of the workpiece, cutters, and fixtures used in the NC milling process. The dexel representation, derived from the dexel data structure[9], is built on a dexel coordinate system which has an integer x- and y-axis in addition to a floating point z-axis. The x- and y-coordinate values are used to build a data array for storing dexels at every (x,y) location, while the z-coordinate value characterizes the depth of dimension of the dexel extents from the xy-plane, called the dexel plane. Several Boolean operations such as union, intersection, and difference, are implemented for the dexel representation. These operations compare and update the depth of dexels thereby modeling the shape change of workpiece during milling operation.

Dexel Coordinate System

The dexel coordinate system is defined by a depth vector denoted by $v_d$, an origin point, O, and an orientation vector, $v_o$, in the world coordinate system. Axial vectors of the dexel coordinate system are thus defined by, $$\begin{bmatrix} V_x \\ V_y \\ V_z \end{bmatrix} = \begin{bmatrix} V_d \times V_o \\ V_x \times V_d \\ V_d \end{bmatrix} \quad (1)$$

The vectors $v_d$ and $v_o$ are analogous to the vectors typically required to define a viewing transformation in computer graphics applications, i.e., the viewing direction and the view-up vector, respectively[13]. Although van Hook's original presentation of the dexel data structure assumes that $v_d$ is aligned with the view direction, in this invention, the two are considered independent. Let $i_1$, $i_2$ and $i_3$ be the normalized vectors of $v_x$, $v_y$ and $v_z$, respectively. The transformation between the dexel coordinate system and the world coordinate system is:

$$P^w = \begin{bmatrix} i_{1x} & i_{2x} & i_{3x} & O_x \\ i_{1y} & i_{2y} & i_{3y} & O_y \\ i_{1z} & i_{2z} & i_{3z} & O_z \\ 0 & 0 & 0 & 1 \end{bmatrix} \cdot P^d = M \cdot P^d \quad (2)$$

where $P^d$ and $P^w$ denote the homogeneous coordinate values in the dexel and the world coordinate systems, respectively. Dexel locations are represented by a grid in the x-y plane, or dexel plane so that each grid point is addressed by an integer pair (x,y). Each dexel is physically a rectangular solid extending along the floating-point z-axis of the dexel coordinate system, and the centroid of the rectangular solid projects exactly onto a grid point of the dexel plane. The length of a dexel is determined by a z-depth pair $(z_n, z_f)$, where the subscripts n and f denote near and far z values, respectively. Denoting the physical width of a dexel by a floating-point value w and height by h, the world coordinate value of a grid point (x,y) on the dexel plane is given by, $$P^w = M \cdot \begin{bmatrix} w \cdot x \\ h \cdot y \\ 0 \\ 1 \end{bmatrix} \quad (3)$$

Since dexels are located on grid points, equation (3) can be used for transformation between the world and dexel coordinate systems. Note that since only integer values are valid dexel coordinates, transformations from world to dexel coordinate system may introduce error and thus is avoided in dimensional NC verification.

Scan Conversion of Dexel Representation

A scan conversion process[13] is used to convert solid objects, as for example modeled by a computer aided design (CAD) system, or representing the cutter, workpiece, or fixture, to a dexel representation. Parallel rays are fired from a sub-set of grid points on the dexel plane to intersect solid objects. Every segment of a ray that is inside of any object is used to establish a dexel. Finally, a collection of dexels is generated and recorded to represent the objects. An example of scan conversion of a tetrahedron is shown in FIG. 1, where the rays are parallel to the z-axis and the grid points for scan conversion are limited by a bounding rectangle. During the scan conversion process, near and far depths of dexels are generated, as well as surface outward normal vectors at both faces of each dexel. These surface normal vectors are utilized to shade the front and back faces of a dexel. Furthermore, since a solid object has material properties (e.g., color, material type, material function, etc.), these properties may also be recorded in the dexel representation. An example of a dexel data type implemented in the C language is:

```
typedef struct {
    double near_z,
    far_z; int near_color,
    far_color;dexel_ptr next_dexel; int type;
} dexel, *dexel_ptr;
```

Figure 2:
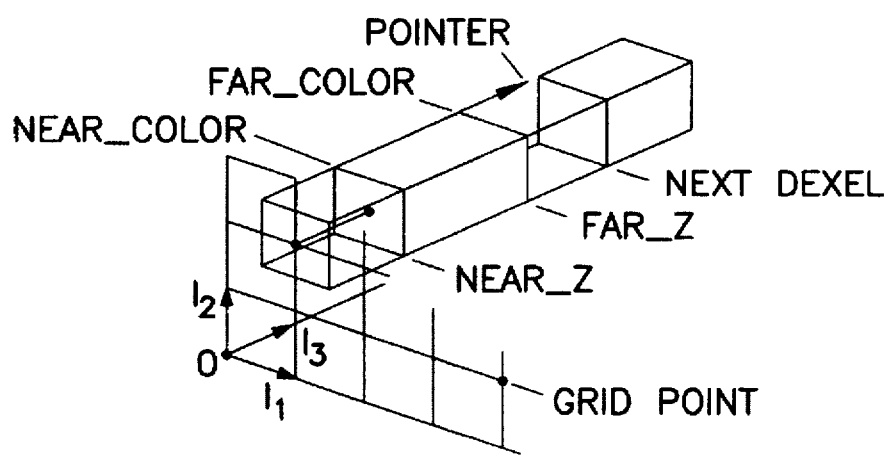
FIG. 2 is a pictorial representation of a dexel data structure in the preferred embodiment of the present invention.

As illustrated in FIG. 2, near_z and far_z are the near and far depth values of a dexel; near_color and far_color are dot products of surface unit normal vectors of both sides of a dexel and a vector $v_1$ originating from an infinite light source; next_dexel points to the next dexel in a dexel chain, or null if no dexel follows; type is used to denote the owner, either cutter, workpiece, or fixture, of a dexel. The magnitude of the lighting vector $v_1$ is determined by the number of intensity values used to display a color under different lighting directions, therefore the dot product, after rounded to an integer value, can depict a color in a pre-defined look up table to shade the dexel.

Boolean Operations on Dexel Models

Figure 3A:
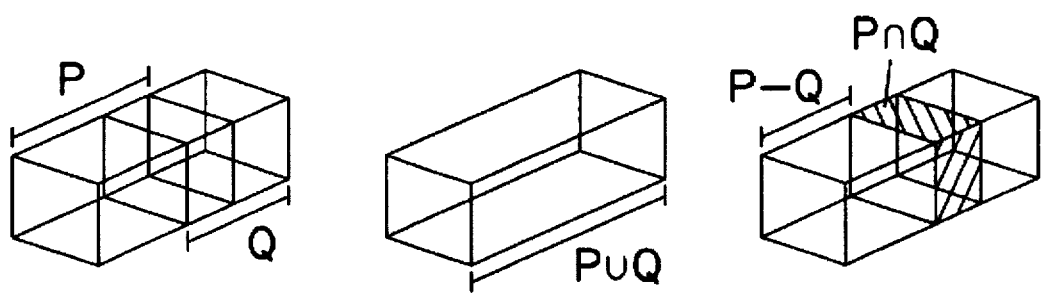
FIGS. 3A, 3B and 3C are illustrations of Boolean operations in the preferred embodiment of the present invention.
Figure 3B:
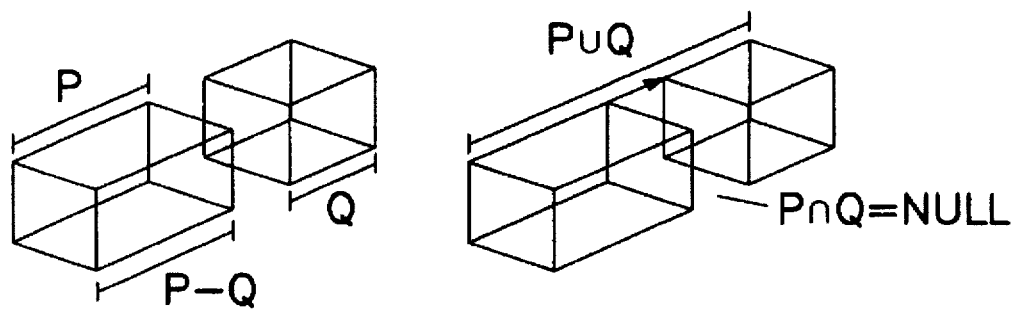
Figure 3C:
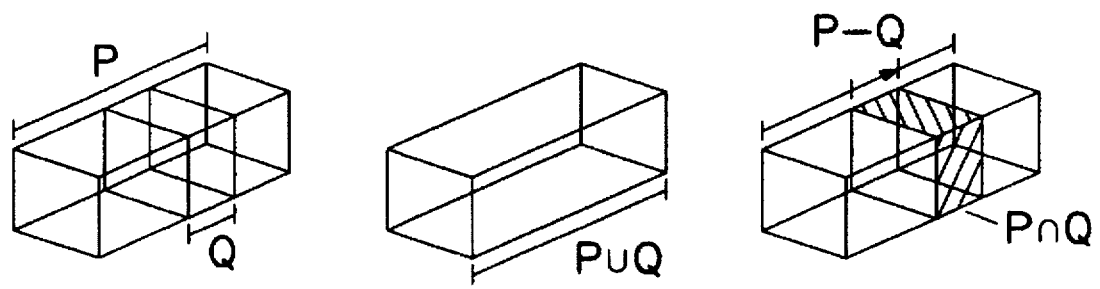

Several Boolean operations, including union, intersection, and difference, are defined for the dexel representation. The union operation (∩) either merges two intersecting dexels together or constructs a link between two separate dexels, as illustrated in FIG. 3A. The intersection operation (∪) forms a dexel that belongs commonly to two dexels, or generates null for no intersection (FIG. 3B). The difference operation (−) removes the intersection portion from the dexel to be subtracted (FIG. 3C). A newly generated dexel will inherit properties from the original dexels that are involved in the Boolean operation, i.e., near_color, far_color, and type of a new dexel are determined by the dexel that creates it. For example, in FIG. 3A, the new dexel P-Q will have a near color from P's near color, a far_color from Q's near_color, and type from P's. It is generally not desirable to intersect two dexels that have different material types because the resulting material type is ambiguous. To solve this problem, each material type is assigned a priority index. Thus the material type of the higher priority dexel is designated to the new dexel.

Figure 4A:
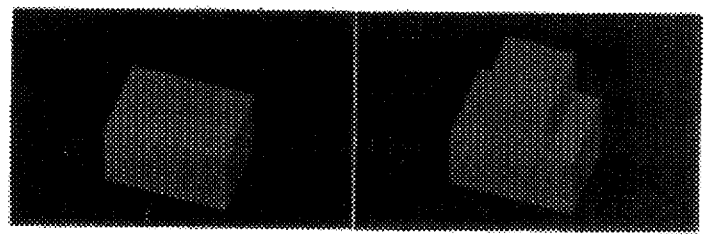
FIG. 4A is a shaded image illustration of a Union operation in the preferred embodiment of the present invention.
Figure 4B:
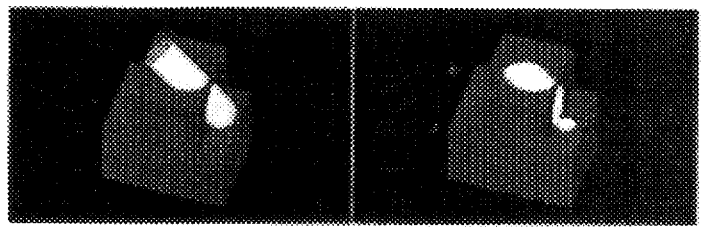
FIG. 4B is a shaded image illustration of a Difference operation in the preferred embodiment of the present invention.

An example of these Boolean operations is given in FIGS. 4A and 4B. In FIG. 4A, the inverted T-shaped solid is constructed by using union operations between dexels of two blocks. FIG. 4B shows the union of two different types of objects and illustrates the result of a Boolean difference operation. The Boolean difference operation will be used intensively for graphical NC milling simulation.

Graphical Display of Dexel Representation

Figure 5:
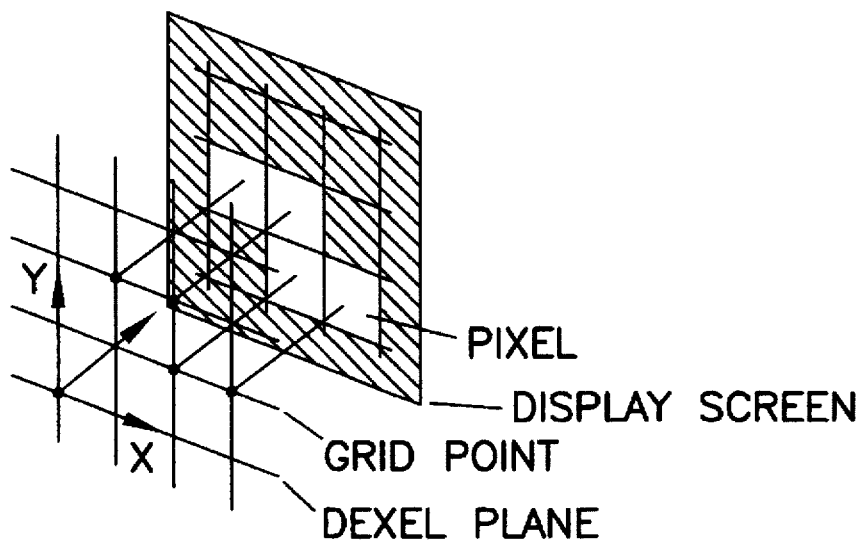
FIG. 5 is an illustration of an image-space display method in the preferred embodiment of the present invention.

The most efficient display method for the dexel representation is to align the dexel coordinate system with the screen coordinate system, so that each grid point on the dexel plane matches a pixel of the display screen, as illustrated in FIG. 5. Since the z axis of the dexel coordinate system is parallel to the viewing vector, only the frontmost face of a dexel chain at each grid point is visible. Hence this method, called image-space display[9], is very efficient for simulation. The image-space display method limits object-viewing along views parallel to the z-axis of the dexel coordinate system. Although the shaded figures presented by this invention are generated with the image-space display method, the dexel representation and Boolean operations are independent of the display method, i.e., they only depend on the orientation of the dexel coordinate system relative to the world coordinate system.

Two methods that can display dexel representation from any viewing direction without reconstructing the entire data structure are possible. One method utilizes methods similar to those for displaying the octree data structure[13,14], i.e., the physical shape of every dexel in 3D space is displayed with proper shading on three possibly visible faces. The other method uses the central points of front and back faces of all dexels to form a triangular mesh[15,16]. The triangular mesh can also be converted into a boundary representation solid modeling schemes, for example, the winged-edge data structure[4].

FIVE-AXIS NC SIMULATION AND VERIFICATION

Continuously performing Boolean difference operations between the moving tool and the workpiece setup (workpiece and fixtures) simulates the operation of multi-axis NC milling. Based on this simulation method, the present invention provides a discrete dexel NC verification method to exploit the respective advantages of normal vector intersection and spatial partitioning representation approaches.

Five-Axis NC Milling Simulation

Simulation of the NC milling process is performed by subtracting tool dexels from those of the workpiece setup. The simulation algorithm and software of the invention first decomposes the tool path into a series of tool motions, then discretizes each tool motion into several instances. Each adjacent instance is separated by at most one unit along the x- or y-axis of the dexel coordinate system. The milling tool is placed at every instance sequentially and the shape of the workpiece is updated by Boolean difference operations, as illustrated in FIG. 4(b).

Figure 6:
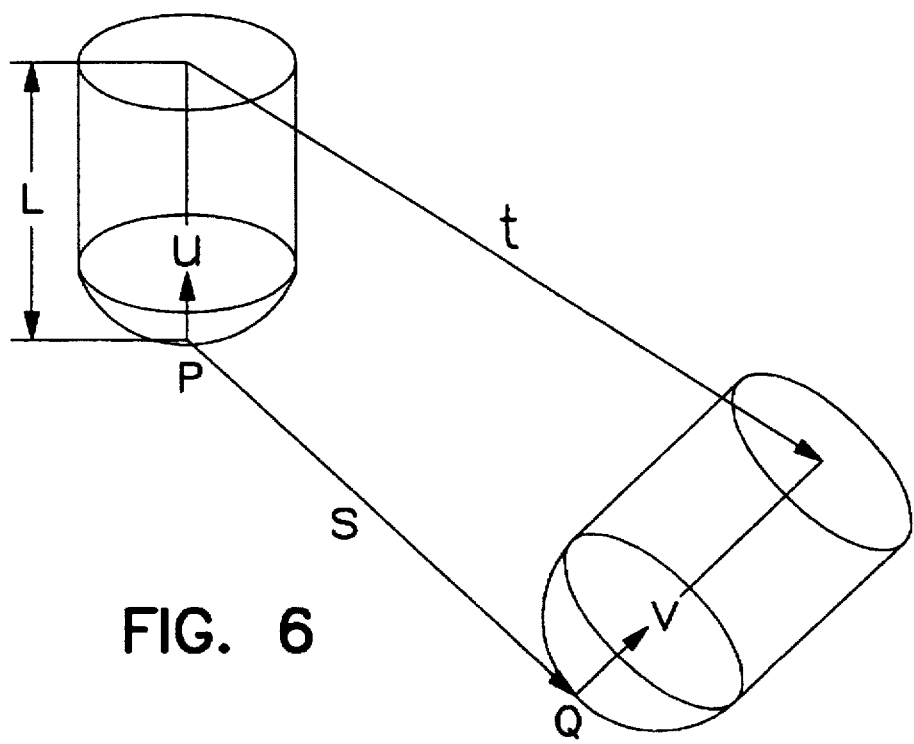
FIG. 6 is an illustration of computing instances of tool motion in the preferred embodiment of the present invention.

The instances of motion approach approximates tool swept volumes to dexel resolution, therefore, the result is identical to the scan conversion model of the tool swept volume, but the computational complexity is much lower. Let the start and end CL points of a tool motion be denoted by P and Q, respectively, and the unit tool axes by u and v, as shown in FIG. 6. Transforming the CL points and tool axes into the dexel coordinate system via Equation 2 yields P', Q', u', v', respectively. The linear sweeping vectors of the top and the bottom center points, denoted by s and t, are given in the dexel coordinate system by, $$s = Q' - P' \quad (4)$$

$$t = s + L(v' - u')$$

where L is the length of the tool. The total number of instances of motion, denoted by n, is given by, $$n = ceil\left(\frac{max(|s_x|,|s_y|,|s_z|,|t_x|,|t_y|,|t_z|)}{w}\right) \quad (5)$$

where w is the dimension of the dexel face, ceil is a function which returns the smallest integer value not less than the given parameter. The tool location and axis defined in the world coordinate system at each instance of motion, denoted by $I_i^w$, are thus defined by, $$I_i^w = \left[P + \frac{i}{n}(Q-P), u + \frac{i}{n}(u-v)\right] \quad (6)$$

where i=0, 1 ... n. The coordinate values of CL points in the dexel coordinate system, denoted by $I_i^d$, is given by, $$I_i^d = \left[floor\left(\frac{P_x + \frac{i}{n}s_x}{w} + 0.5\right) floor\left(\frac{P_y + \frac{i}{n}s_y}{w} + 0.5\right) P_z + \frac{i}{n}s_z\right] \quad (7)$$

where floor is a function which returns the largest integer value not greater than the given parameter. The x- and y-component are rounded to address the nearest grid point, the z-component remains a floating point depth value.

Figure 7:
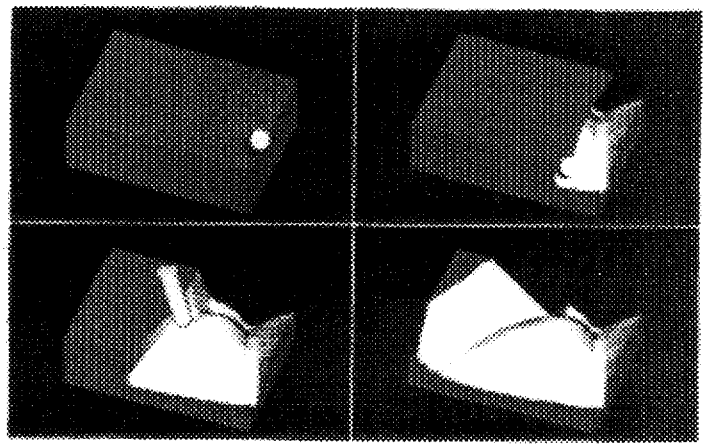
FIG. 7 is a graphical simulation of a five-axis NC milling process in the preferred embodiment of the present invention.

Applying this formula and the Boolean difference operations, sequential images of a five-axis NC milling simulation may be generated, as shown, for example, in FIGS. 7. For three-axis milling simulations, the dexel representation of the cutting tool is only scan converted once and is translated to all instances of motion[9]. For five-axis milling simulations, however, the dexel representation of the tool can not be transformed for different tool orientations. Therefore, the tool dexel representation is scan converted at every instance of motion, which is more computationally intensive than three-axis milling simulation. However, the computation time can be reduced by checking if the tool axis is fixed during a motion. In this case the faster three-axis simulation method can still be applied to the segment of simulation.

An alternative method for tool motion representation is scan converting a five-axis swept volume for each tool motion[5,17]. However, since scan converting a swept volume is much more computationally expensive, it is not preferred. Furthermore, since the dexel representation is limited by the grid resolution, both methods will theoretically provide identical results.

Discrete Dexel NC Verification

Figure 8:
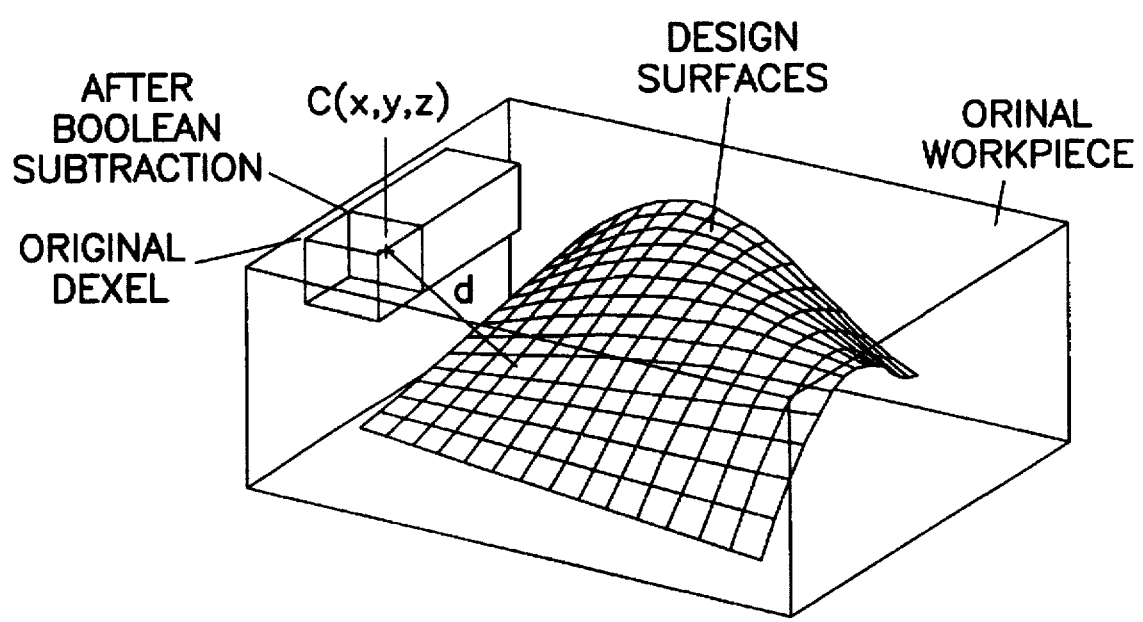
FIG. 8 is an illustration of a five-axis NC milling process in the preferred embodiment of the present invention.

Since the shape of a milled workpiece is characterized by the dexel representation, the central point, called the face point, of the front or back face of a dexel will lie on the boundary of the workpiece. Although the dexel representation of the workpiece is approximate, the face points which are generated during the scan conversion process and Boolean operations lie exactly on the workpiece shell. The discrete dexel NC verification algorithm and software of the invention exploits this fact and computes the deviation between dexels and design surfaces during the simulation process. Hence as the animated simulation process proceeds, graphical results of dimensional verification are presented simultaneously. Like the discrete vector intersection approach, the discrete dexel NC verification algorithm can be characterized by two procedures: localization and distance calculation. However, due to the characteristics of dexel representation, this localization task is much easier to perform, i.e., the subset of face points to be verified lie on dexels updated by the Boolean difference operations. Thus, only those portions of the milled surface which are modified during a particular tool motion are changed. FIG. 8 illustrates an instance of the verification algorithm, where a dexel is updated by the Boolean difference operation and the new face point C is verified for milling error d by a distance calculation algorithm.

The distance calculation algorithm computes the minimum distance d between a face point and design surfaces, as depicted in FIG. 8. Since design surfaces are not discretized, several well known methods can be utilized to find a surface near-point based on the orthogonal property[18,19]. The orthogonal property addresses that the minimum distance between a space point P and a surface S(u,v) occurs when they are connected via the surface normal vector. The formulation utilized in this invention is a system of two equations:

$$\begin{bmatrix} \frac{\partial S_x}{\partial u} & \frac{\partial S_y}{\partial u} & \frac{\partial S_z}{\partial u} \\ \frac{\partial S_x}{\partial v} & \frac{\partial S_y}{\partial v} & \frac{\partial S_z}{\partial v} \end{bmatrix} \begin{bmatrix} P_x - S_x \\ P_y - S_y \\ P_z - S_z \end{bmatrix} = \begin{bmatrix} 0 \\ 0 \end{bmatrix} \quad (8)$$

and the solution is obtained by Newton's method[22]. Since a surface is bounded in the parametric space, it is possible that no solution can satisfy equation (8). In such cases, the minimum distance is measured between P and the nearest boundary point. Also, there can be several surface points satisfying equation (8), so a preprocess is implemented that isolates a sub-patch containing the global minimum. This preprocess is based on the basic properties of NURBS surfaces[20,21].

Figure 9:
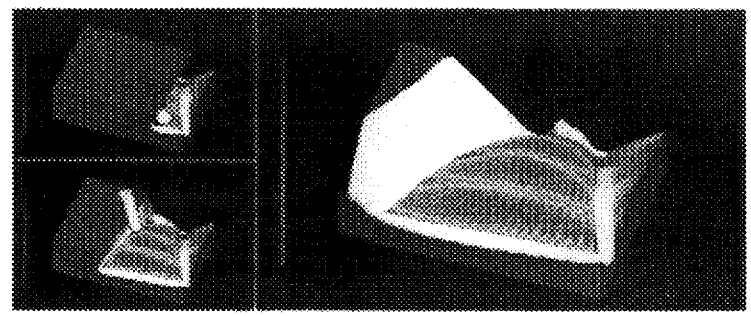
FIG. 9 is an illustration of the result of discrete dexel NC verification in the preferred embodiment of the present invention.

A sample result of the verification algorithm is demonstrated in FIG. 9. In this figure, color-coded milling error information is displayed on the workpiece, which characterizes the shape of the milled surfaces. The color map shown at the left-hand side of the figure depicts the range of milling error. The green color represents errors that are within a specified tolerance, the upper eight colors represent the depth of undercut, and the lower represent overshoot. The upper and lower bound of the color map is determined by a user specified range, called the range of interest 1 (−0.05 to 0.05 in this case). Values of milling error that are within the range of interest are displayed by corresponding colors. For overshoot deeper than the lower bound of the range of interest, the color depicting the deepest overshoot is used. For undercut larger the higher bound of the range of interest, the color of milling tool is displayed.

Figure 10:
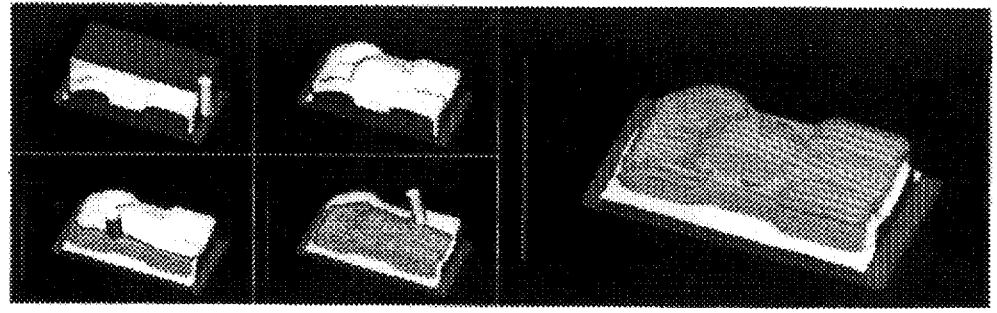
FIG. 10 is an illustration of simulation and verification of a three-axis rough cut and a five-axis finish cut in the preferred embodiment of the present invention.

FIG. 10 demonstrates a set of sequential images of simulation of a three-axis rough milling (3922 CL points) and verification of a five-axis finish cutting (2155 CL points) on a NURBS surface. These images contain 640 by 400 grid points on the dexel plane and were displayed by using the image space display method. The performance is 14.5 and 3 instances per second for the three axis milling simulation and the five-axis verification, respectively. The performance of the algorithm depends on the material removal rate of milling, or the amount of dexels to be updated. Hence the size of the CL-file does not necessarily determine the length of processing time. Intensive computation are required in the five-axis simulation because scan conversion of tool dexel representation is performed at every instance of motion. From the experiment results, the scan conversion of the five-axis tool was the most time consuming part of the simulation and verification algorithm. The verification algorithm is based on the Newton's method, thus the convergence is improved by using the solution of previously found surface point as the initial point of next search. Typically, each search is complete in two iterations and the verification algorithm alone is about 20% of the overall computation. Scan-conversion of five-axis tool was identified as the key step of the overall performance. Improvements can be done by utilizing parallel processing techniques[23,24] or hardware implementation[9,10]. The other bottleneck of the software performance is the graphical display, i.e., the animation of milling process. The overall performance of the algorithm can be boosted by displaying only the final verification results.

HARDWARE AND SOFTWARE IMPLEMENTATION

Figure 11:
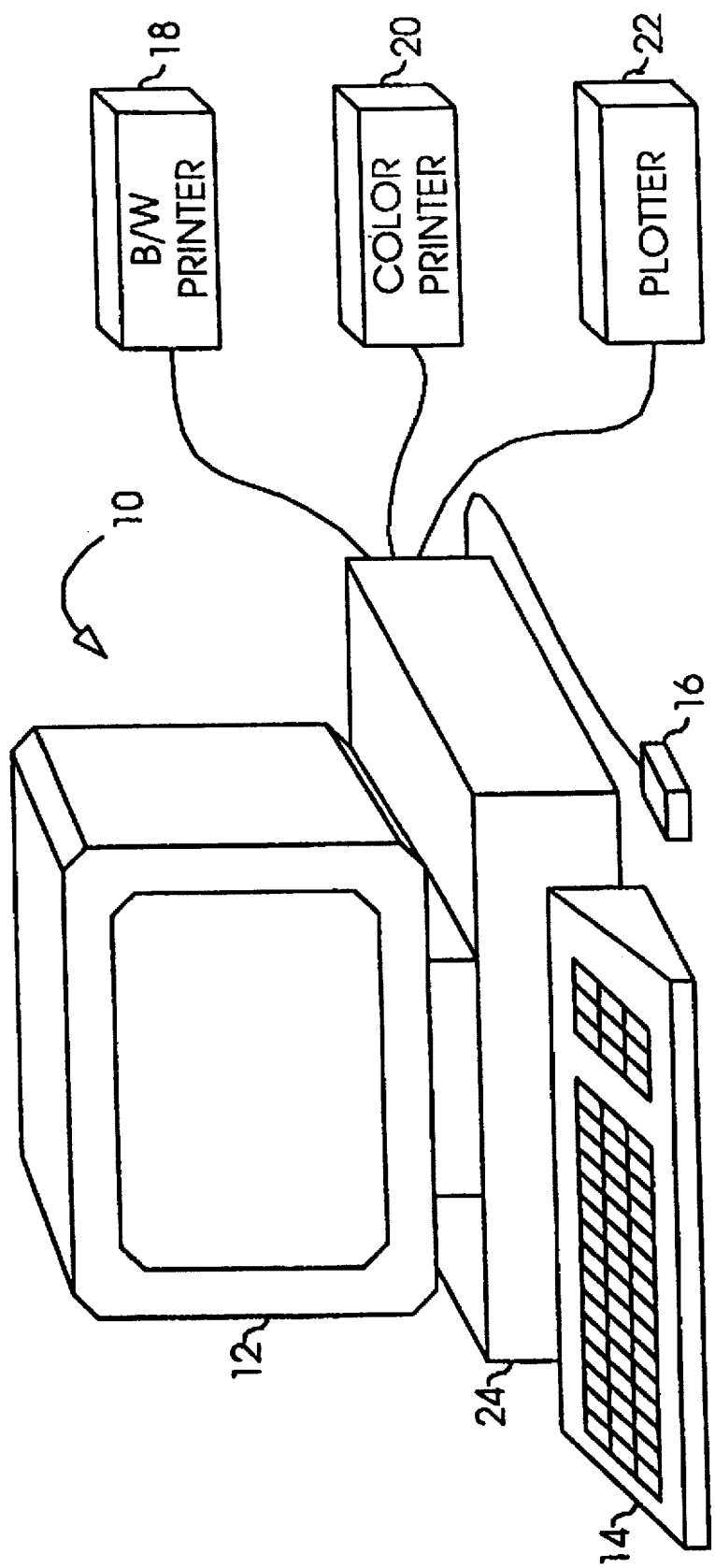
FIG. 11 is a system diagram representing an apparatus for NC milling simulation and dimensional verification in the preferred embodiment of the present invention.

The hardware system of the present invention and a software implementation of the discrete dexel NC milling verification algorithm of the present invention are illustrated in FIGS. 11–14. As shown in FIG. 11, the system includes a workstation 10 (for example a Silicon Graphics Indigo/Elan workstation with a UNIX operating system) including a monitor 12, keyboard 14, mouse 16, black and white printer 18, color printer 20, and printer/plotter 22. Housed in chassis 24 are various other system components including the CPU and other supporting processors, mass storage for and RAM.

Figure 12A:
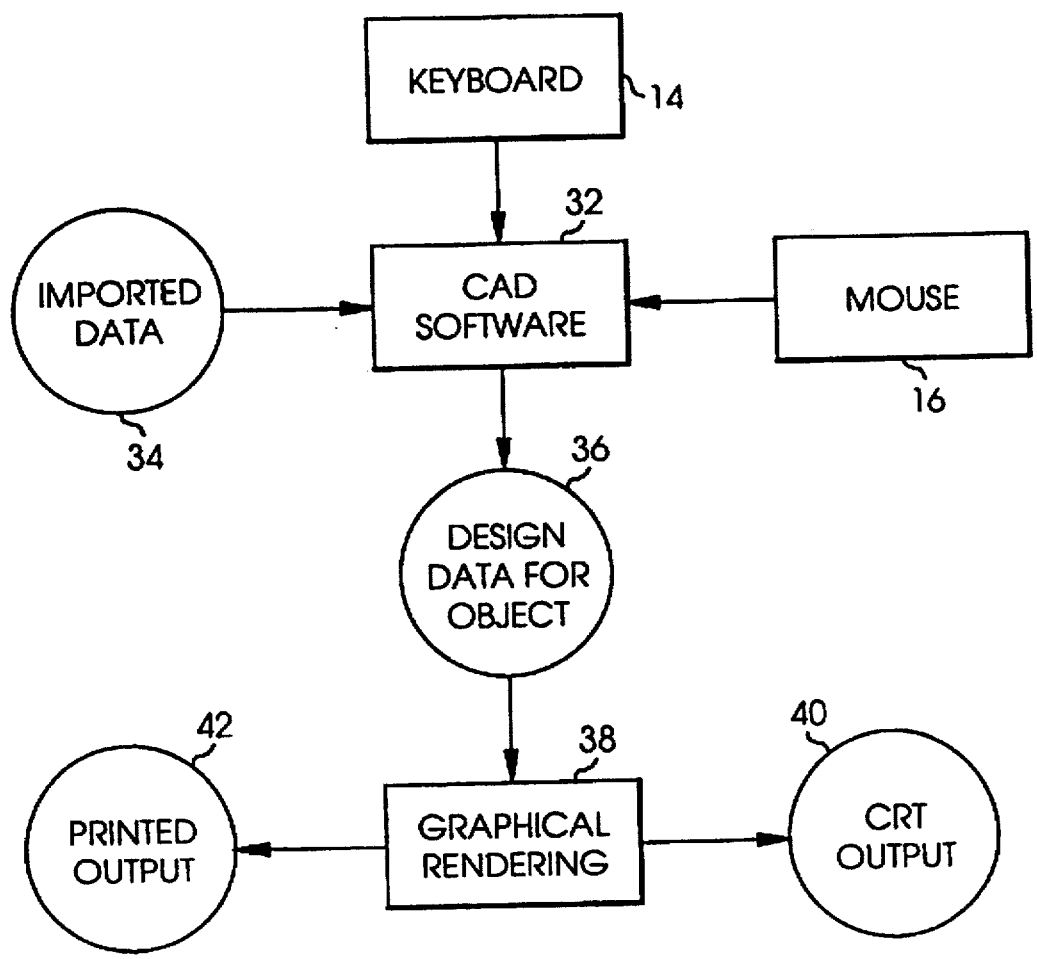
FIGS. 12A and 12B are a structure diagram for NC milling simulation and dimensional verification in the preferred embodiment of the present invention.
Figure 12B:
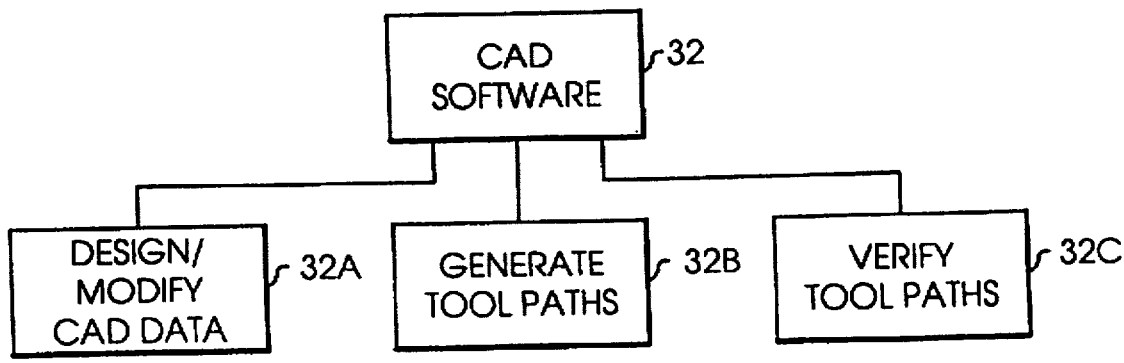

To create and/or modify designs of three dimensional solid objects to be milled, the workstation 10 may be programmed with CAD, solid or geometric modelling software (hereinafter referred to as "CAD software") 30, as illustrated in simplified block diagram form in FIG. 12. CAD software 30 includes routines and modules 32 for creating and modifying design data representing a design object (32A), and in particular an object to be NC milled in the case of the present invention, and for tool path generation (32B), and tool path verification (32C). Software 32 receives input from the keyboard 14 and mouse 16 for this purpose. Software 32 can also import object design data from another source 34, such as a file developed on another system. Software 32, operating on the workstation, produces design data 36 (for example in a NURBS format), which can be rendered graphically by software routines and modules 38, which produce CRT or printed output 40 and 42 respectively.

Figure 13:
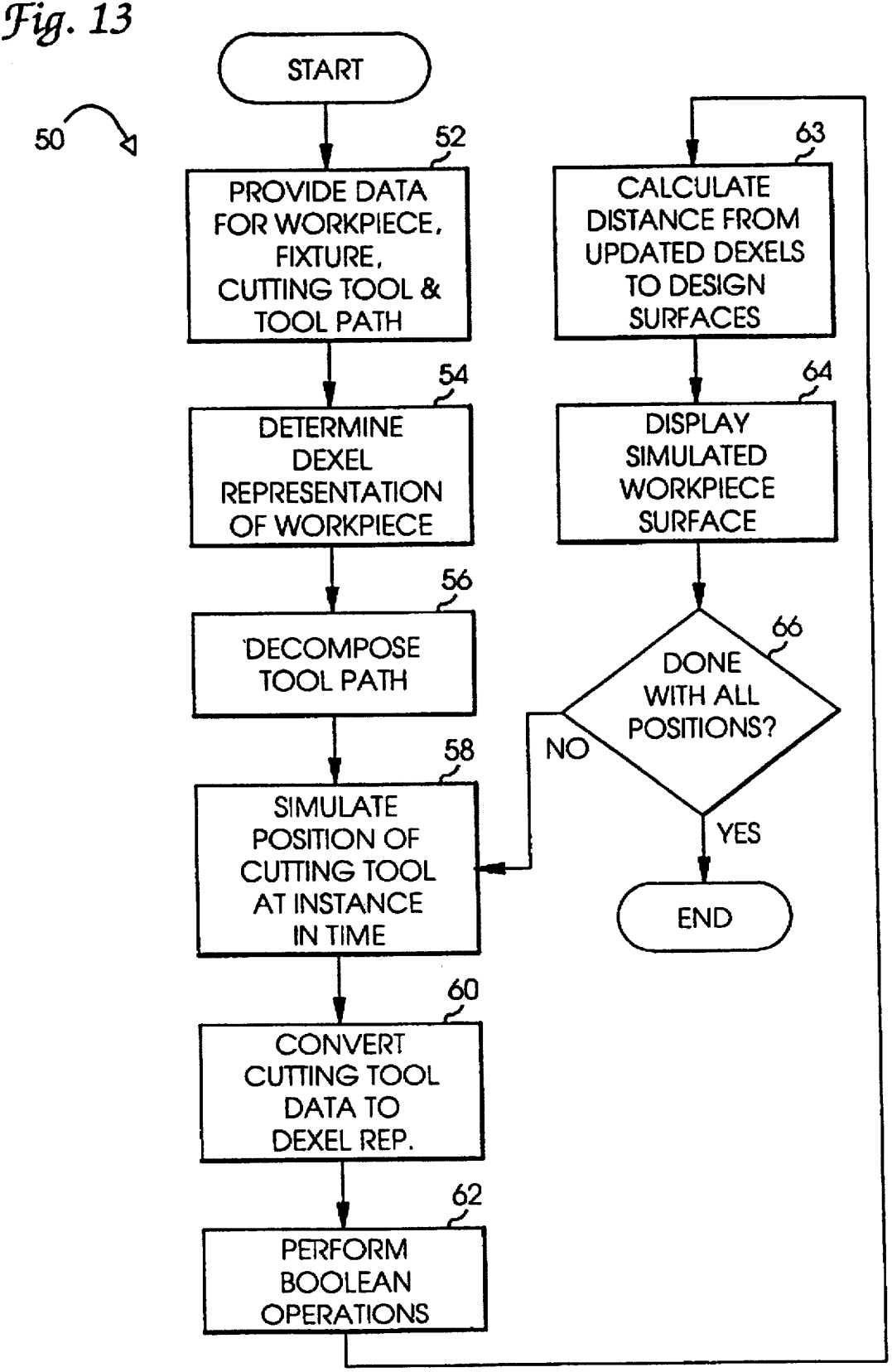
FIG. 13 is a data flow diagram for NC milling simulation and dimensional verification in the preferred embodiment of the present invention.

Referring now to FIG. 13, there is illustrated in simplified flow chart form the process and software 32C of the present invention for verifying NC milling tool paths. Data for the workpiece, fixture, cutting tool and tool path are provided (52). The dexel representations for the workpiece and fixture are determined (54). The tool path is decomposed (56) into a plurality of tool motions, and each tool motion is discretized into a plurality of instances in time. The position of the workpiece at a given instance in time is simulated (58) given the tool motion data, and the solid model of the cutting tool at the corresponding position is converted to a corresponding dexel representation (60). Boolean operations are then performed to subtract the tool dexels from the workpiece, so that the shape of the workpiece is simulated (62). The distance from the updated dexels to the design surfaces are then calculated (63). The graphical representation of the simulated workpiece is then updated based on the newly determined workpiece dexel representation (64). This output can be done as an animation sequence, or as still frames. A check is made to determine if all positions of the cutting tool have been processed (66), and if not the next sequential tool positioned is processed. Otherwise, the process terminates. A complete computer program, written in the C language, for carrying out the functions of software 32C is listed in the Microfiche Appendix hereto.

Figure 14:
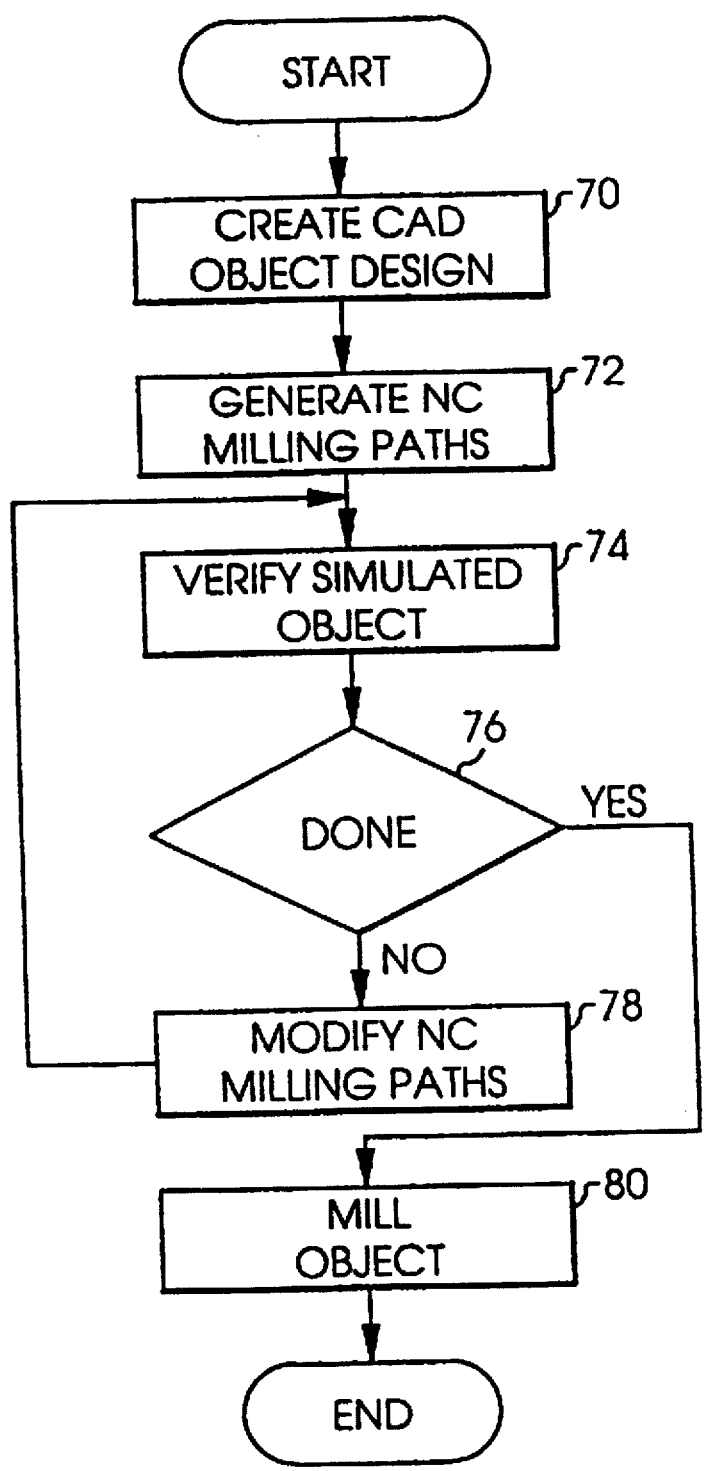
FIG. 14 is a process flow diagram for NC milling simulation and dimensional verification in the preferred embodiment of the present invention.

Referring now to FIG. 14, there is illustrated in simplified flow chart form the design process according to the present invention. A CAD object design is created (70). The milling paths for the object are generated (72). The simulated NC milling process described above is used to verify the tool paths (74). If the tool paths are correct (76), the object is then milled. If not, the NC milling paths are adjusted (78), and re-verified until a suitable solution is found.

Thus, the verification system of the present invention combines the advantages of the discrete vector intersection approach and the spatial-partitioning representation method, and thus is capable of efficiently simulating and verifying precision NC milling operations. As noted, the invention is not limited to use with dexel-based spatial-partitioning, but is applicable to other partitioning schemes as well.

REFERENCES

1) Oliver, J. H. and Goodman, E. D., "Direct Dimensional NC Verification," Computer Aided Design, Vol. 22, No. 1, 1990, pp. 3–10.
2) Sungurtekin, U. A. and Voelcker, H. B., "Graphical Simulation & Automatic Verification of NC Machining Programs," Proc. 1986 IEEE International Conference of Robotics and Automation, April 1986, pp. 156–165.
3) Voelcker, H. B. and Hunt, W. A., "The Role of Solid Modeling in Machine-Process Modelling and NC Verification," SAE Technical Paper No 810195, February 1981.
4) Hoffmann, C. M., Geometric and Solid Modeling, An Introduction, 1989, Morgan Kaufmann Publishers, Inc., San Mateo, Calif.
5) Narvikar, A., Huang, Y. and Oliver, J. H., "Intersection of Rays with Parametric Envelope Surfaces Representing Five-Axis NC Milling Tool Swept Volumes," Proc. ASME Advances in Design Automation 1992, Vol 2, D. A. Hoeltzel, ed., pp. 223–230.
6) Jerard, R. B., Hussaini, S. Z., Drysdale, R. L., and Schaudt, B., "Approximate Methods for Simulation and Verification of Numerically Controlled Machining Programs," The Visual Computer, 1989, pp. 329–348.
7) Chang K. Y. and Goodman E. D., "A Method for NC Tool Path Interference Detection for A Multi-Axis Milling System," ASME Control of Manufacturing Process, DSC-Vol. 28/PED-Vol. 52, 1991, pp. 23–30.
8) Oliver, J. H., "Efficient Intersection of Surface Normals With Milling Tool Swept Volumes for Discrete Three-Axis NC Verification," Journal of Mechanical Design, June 1992, Vol. 114, pp. 283–287.
9) van Hook, T., "Real-Time Shaded NC Milling Display," Computer Graphics, (Proc. SIGGRAPH '86), Volume 20, Number 4, August, 1986, pp. 15–20.
10) Menon, J. P. and Robinson, D. M., "High Performance NC Verification via Massively Parallel Raycasting: Extension to New Phenomena and Geometric Domains," PED-Vol. 59, Concurrent Engineering, ASME 1992, pp. 179–194.
11) Saito, T. and Takahashi, T., "NC Machining with G-buffer Method," Computer Graphics, Proc. SIGGRAPH '91, Volume 25, Number 4, July, 1991, pp. 207–216.
12) Kawashima, Y., Itoh, K., Ishida, T, Nonaka, S., and Ejiri, K, "A Flexible Quantitative Method for NC Machining Verification Using a Space-Division Based Solid Model," The Visual Computer, 1991, pp. 149–157.
13) Foley, J. D., van Dam, A., Feiner, S. K. and Hughes, J. F., Computer Graphics Principles and Practice, 1990, Addison-Wesley Publishing Company, New York.
14) Samet, H. "Implementing Ray Tracing with Octrees and Neighbor Finding," CGVIP, 46(3), June, 1989, pp. 367–386.
15) Hoppe, H., DeRose, T., Duchamp, T., McDonald, J., and Stuetzle, W., "Surface Reconstruction from Unorganized Points," Computer Graphics (Proc. SIGGRAPH '92), Vol. 26, No. 2, July, 1992, pp. 71–78.
16) Mayers, D., and Skinner, S., "Surfaces from Contours," ACM Trans. on Graphics, Vol. 11, No. 3, July, 1992, pp. 228–258.
17) Wang, W. P., and Wang, K. K., "Geometric Modeling for Swept Volume of Moving Solids," IEEE Computer Graphics and Applications, December, 1986, pp. 8–17.
18) Pegna, J. and Wolter, F.-E., "Designing and Mapping Trimming Curves on Surfaces Using Orthogonal Projection," Proc. ASME Advances in Design Automation, Vol. 1, Computer Aided and Computational Design, DE-Vol. 23-1, September, 1009, pp. 235–245.
19) Barnhill, R. E. and Kersey, S. N., "A Marching Method for Parametric Surface/Surface Intersection," Computer Aided Geometric Design, No. 7, 1990, pp. 257–280.
20) Piegl, L., "Curve and Surface Constructions Using Rational B-Splines," Computer-Aided Design, Vol. 19, No. 9, November 1987, pp. 485–498.
21) Piegl, L., "On NURBS: A Survey," IEEE Computer Graphics and Applications, January, 1991, pp. 55–71.
22) Kincaid, D. and Cheney, W., Numerical Analysis, Mathematics of Scientific Computing, Brooks/Cole Publishing Company, 1991, CA.
23) Leighton, F. T., Introduction to Parallel Algorithm and Architectures: Arrays, Trees, Hypercubes, M. Kaufmann Publishers, 1992, CA.
24) Baron, R. J. and Higbie, L., Computer Architecture, 1992, Addison Wesley Publishing Company, New York.

What is claimed is:

1. A method for visualization of a five-axis NC milling process simulation to determine the ability of a NC milling operation to produce a desired design surface of a designed object, said method using a computer having an output display device, comprising the steps of:
  (a) providing the computer with data representing a solid object representation of a workpiece, a cutting tool, and a surface of the designed object;
  (b) converting, using the computer, the data to provide a dexel representation of the workpiece, the dexel representation of the workpiece comprising a plurality of workpiece dexels;
  (c) providing the computer with five-axis tool path data representative of a tool path to be used in milling the workpiece with the cutting tool;
  (d) decomposing the tool path into a series of tool motions and discretizing each tool motion into a plurality of discrete positions, wherein the tool motions are represented by tool motion data;

(e) using the tool motion data, simulating on the computer the position of the cutting tool relative to the workpiece at a particular position, and for that position converting the solid model data of the cutting tool to a corresponding dexel representation of the cutting tool comprising a plurality of cutting tool dexels;

(f) using the computer and the cutting tool dexels, determining a simulated shape of the workpiece by performing Boolean difference operations between the workpiece dexels and the cutting tool dexels to produce a set of updated workpiece dexels comprising those workpiece dexels that intersected with the cutting tool dexels at the position;

(g) using the computer to determine the distance between one or more of the updated workpiece dexels and the design surface, the distance determined by finding a point on the design surface near a dexel for which the distance to the design surface is being determined; and (h) repeating steps (e), (f) and (g) to process a plurality of successive cutting tool positions; and (i) using the computer and the distances determined in step (g), generating, on the output display device, a graphical display in at least two dimensions of the difference between the desired design surface and the simulated shape of the workpiece.

2. A method according to claim 1 further including the step of generating and updating the graphical display substantially simultaneously with the determining of the distances in step (g) to simulate the removal of material from the workpiece as the cutting tool moves along a cutting tool path.

3. A method according to claim 1, further including the step of color-coding the difference between the desired design surface and the simulated shape.

4. A method according to claim 1, further including the step of generating on the output device a graphical display of the difference between the simulated shape and the design surface as an animated sequence.

5. A method according to claim 1 further wherein the step (g) of determining the distance includes the step of using an orthogonal property to find a point on the design surface near the dexel for which the distance to the design surface is being determined.

6. A method according to claim 5 further including the step of using the computer to preprocess the design surface to find a sub-patch of the design surface to look for the nearest point on.

7. A method for visualization of a NC milling process simulation to determine the ability of a NC milling operation to produce a desired design surface of a designed object, said method using a computer having an output display device, comprising the steps of:

(a) providing the computer with data representing a solid object representation of a workpiece and a cutting tool, and a surface of the designed object;

(b) converting, using the computer, the data to provide a spatial-partitioned representation of the workpiece, the spatial-partitioned representation of the workpiece comprising a plurality of workpiece subregions each defined by a corresponding data set;

(c) providing the computer with tool path data representative of a tool path to be used in milling the workpiece with the cutting tool;

(d) using the tool path data, simulating on the computer the positions of the cutting tool relative to the workpiece and converting the solid model data of the cutting tool to a corresponding spatial-partitioned representation of the cutting tool positions wherein the spatial-partitioned representation comprises a plurality of cutting tool subregion each defined by a corresponding data set;

(e) using the computer and the cutting tool subregions, determining a simulated shape of the workpiece by performing Boolean difference operations between the workpiece subregions and the cutting tool subregion to produce a set of updated workpiece subregions comprising those workpiece subregions that intersected with the cutting tool subregions;

(f) using the computer to determine the distance between the updated workpiece subregions and the design surface, the distance determined by finding a point on the design surface near a subregion for which the distance to the design surface is being determined; and (g) using the computer and the distances determined in step (f), generating, on the output device, a graphical display in at least two dimensions of the difference between the desired design surface and the simulated shape of the workpiece.

8. A method according to claim 7 wherein said subregions of said workpiece and said cutting tool positions are defined as dexels.

9. A method according to claim 7 further wherein step (d) includes the steps of:

(i) decomposing the tool path into a series of tool motions and discretizing each tool motion into a plurality of discrete positions, wherein the tool motions are represented by tool motion data; and (ii) using the tool motion data, simulating on the computer the position of the cutting tool relative to the workpiece at a particular position, and for that position converting the solid model data of the cutting tool to a corresponding spatial-partitioned representation of the cutting tool comprising a plurality of cutting tool subregions each defined by a corresponding data set; and further wherein the steps (e) and (f) are performed sequentially for each of the discretized instances in time so that a plurality of successive cutting tool positions occurring at different instances in time are processed in sequence.

10. A method according to claim 7 further including the step of generating and updating the graphical display substantially simultaneously with the determining of the distances in step (f) to simulate the removal of material from the workpiece as the cutting tool moves along a cutting tool path.

11. A method according to claim 7, further including the step of color-coding the difference between the desired design surface and the simulated shape.

12. A method according to claim 7, further including the step of generating on the output device a graphical display of the difference between the simulated shape and the design surface as an animated sequence.

13. A method according to claim 7 further wherein the step (f) of determining the distance includes the step of using an orthogonal property to find a point on the design surface near the subregion for which the distance to the design surface is being determined.

14. A method according to claim 7 further including the step of using the computer to preprocess the design surface to find a sub-patch of the design surface to look for the nearest point on.

15. Apparatus for visualization of NC milling process simulation to determine the ability of a NC milling operation to produce a desired design surface of a designed object, comprising:

(a) means for storing data representing a solid object representation of a workpiece and a cutting tool, and a surface of the designed object, and for storing tool path data representative of a tool path to be used in milling the workpiece with the cutting tool;

(b) means for converting the data to provide a spatial-partitioned representation of the workpiece, the spatial-partitioned representation of the workpiece comprising a plurality of workpiece subregions each defined by a corresponding data set;

(c) means using the tool path data for simulating the positions of the cutting tool relative to the workpiece and converting the solid model data of the cutting tool to a corresponding spatial-partitioned representation of the cutting tool positions wherein the spatial-partitioned representation comprises a plurality of cutting tool subregions each defined by a corresponding data set;

(d) means using the cutting tool subregions for determining a simulated shape of the workpiece by performing Boolean difference operations between the workpiece subregions and the cutting tool subregions to produce a set of updated workpiece subregions comprising those workpiece subregions that intersected with the cutting tool subregions;

(e) means for determining the distance between the updated workpiece subregions and the design surface, the distance determined by finding a point on the design surface near the subregion for which the distance to the design surface is being determined;

(f) an output display device; and (g) means using the determined distances for generating, on the output display device, a graphical display in at least two dimensions of the difference between the desired design surface and the simulated shape of the workpiece.

16. The apparatus of claim 15 further wherein subregions of said workpiece and said cutting tool positions are defined as dexels.

17. The apparatus of claim 15 further wherein the means for determining the distance between the updated workpiece subregions and the design surface includes means for using an orthogonal property to find a point on the design surface near the subregion for which the distance to the design surface is being determined.

18. The apparatus of claim 17 further including means for preprocessing the design surface to find a sub-patch of the design surface to look for the nearest point on.

19. A method for designing and manufacturing an object using NC milling, comprising the steps of:

(a) creating a design for the object on a computer-aided-design system to produce a designed object;

(b) using a computer, generating NC milling path data designed to cut a workpiece to provide at least one surface of the designed object;

(c) using milling process simulation to determine the ability of a NC milling operation to produce the desired design surface, said process using a computer having an output device, comprising the steps of:

(1) providing the computer with data representing a solid object representation of a workpiece and a cutting tool, and a surface of the designed object;

(2) converting, using the computer, the data to provide a spatial-partitioned representation of the workpiece, the spatial-partitioned representation of the workpiece comprising a plurality of workpiece subregions each defined by a corresponding data set;

(3) providing the computer with the tool path data representative of a tool path to be used in milling the workpiece with the cutting tool;

(4) using the tool path data, simulating on the computer the positions of the cutting tool relative to the workpiece and converting the solid model data of the cutting tool to a corresponding spatial-partitioned representation of the cutting tool positions wherein the spatial-partitioned representation comprises a plurality of cutting tool subregions each defined by a corresponding data set;

(5) using the computer and the cutting tool subregions, determining a simulated shape of the workpiece by performing Boolean difference operations between the workpiece subregions and the cutting tool subregions to produce a set of updated workpiece subregions comprising those workpiece subregions that intersected with the cutting tool subregions; and (6) using the computer to determine the distance between the updated workpiece subregions and the design surface, the distance determined by finding a point on the design surface near the subregion for which the distance to the design surface is being determined;

(d) using the distances determined in step (c), adjusting the NC milling tool path data to improve the milling of the workpiece to obtain the desired design surface; and (e) milling a workpiece using the adjusted tool path data to produce the desire surface of the designed object.

20. A computer-aided-design system for designing an object and creating NC milling tool path data for milling at least one surface of the designed object, comprising:

(a) computer-aided-design means for designing the object including input means for receiving design instructions from a user and means for displaying the designed object to the user, the computer-aided-design means producing data representative of at least a surface of the designed object;

(b) means for generating NC milling tool path data based on the data representative of the designed object, the tool path data representative of a tool path to be used in milling the workpiece with the cutting tool;

(c) means for storing data representing a solid object representation of a workpiece and a cutting tool, and the surface of the designed object, and for storing the tool path data;

(d) means for converting the data to provide a spatial-partitioned representation of the workpiece, the spatial-partitioned representation of the workpiece comprising a plurality of workpiece subregions each defined by a corresponding data set;

(e) means using the tool path data for simulating the positions of the cutting tool relative to the workpiece and converting the solid model data of the cutting tool to a corresponding spatial-partitioned representation of the cutting tool positions wherein the spatial-partitioned representation comprises a plurality of cutting tool subregions each defined by a corresponding data set;

(f) means using the cutting tool subregions for determining a simulated shape of the workpiece by performing Boolean difference operations between the workpiece subregions and the cutting tool subregions to produce a set of updated workpiece subregions comprising those workpiece subregions that intersected with the cutting tool subregions; and (g) means for determining the distance between the updated workpiece subregions and the design surface, the distance determined by finding a point on the design surface near the subregion for which the distance to the design surface is being determined.

* * * * *